US009501185B2

(12) United States Patent
Hu et al.

(10) Patent No.: US 9,501,185 B2
(45) Date of Patent: Nov. 22, 2016

(54) ACTIVE ARRAY OF CAPACITIVE TOUCH PANEL AND ASSOCIATED CAPACITIVE TOUCH PANEL

(71) Applicant: HIMAX TECHNOLOGIES LIMITED, Tainan (TW)

(72) Inventors: Chia-Wei Hu, Tainan (TW); Jui-Ni Li, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 22 days.

(21) Appl. No.: 14/248,342

(22) Filed: Apr. 9, 2014

(65) Prior Publication Data

US 2015/0212615 A1 Jul. 30, 2015

Related U.S. Application Data (60) Provisional application No. 61/932,249, filed on Jan. 28, 2014.

(51) Int. Cl.
G06F 3/044 (2006.01)
(52) U.S. Cl.
CPC ..... G06F 3/044 (2013.01); *G06F 2203/04107* (2013.01)
(58) Field of Classification Search
None
See application file for complete search history.

(56) References Cited

U.S. PATENT DOCUMENTS

| | | | | |
|---|---|---|---|---|
| 9,151,790 B1* | 10/2015 | Hoshtanar | .......... | G01R 27/2605 |
| 2009/0085885 A1* | 4/2009 | Wu | .......... | G06F 3/041 345/173 |
| 2009/0213090 A1* | 8/2009 | Mamba | .......... | G06F 3/044 345/174 |
| 2012/0105081 A1* | 5/2012 | Shaikh | .......... | G06K 9/0002 324/686 |
| 2013/0300691 A1* | 11/2013 | Huang et al. | .......... | 345/173 |
| 2013/0342770 A1* | 12/2013 | Kim et al. | .......... | 349/12 |
| 2014/0313439 A1* | 10/2014 | Matsumoto | .......... | G06F 3/0412 349/12 |

FOREIGN PATENT DOCUMENTS

| | | |
|---|---|---|
| CN | 103513479 A | 1/2014 |
| JP | 2013041325 A | 2/2013 |
| KR | 1020130104857 A | 9/2013 |

* cited by examiner

*Primary Examiner* — Kent Chang
*Assistant Examiner* — Benjamin Morales Fernandez
(74) *Attorney, Agent, or Firm* — Winston Hsu; Scott Margo (57) ABSTRACT

An active array of a capacitive touch panel includes a plurality of first electrodes, a plurality of second electrodes and a plurality of first auxiliary electrodes, where the first electrodes are connected to a scan signal transmitting circuit of the capacitive touch panel, and are used for receiving a plurality of scan signals, respectively; the second electrodes are connected to a detecting circuit of the capacitive touch panel; and the first electrodes and the first auxiliary electrodes are fabricated in a same metal layer, and the first electrodes are not connected to the first auxiliary electrodes.

10 Claims, 8 Drawing Sheets

ACTIVE ARRAY OF CAPACITIVE TOUCH PANEL AND ASSOCIATED CAPACITIVE TOUCH PANEL

CROSS REFERENCE TO RELATED APPLICATIONS

This application claims the priority of U.S. Provisional Application No. 61/932,249, filed on Jan. 28, 2014, which is included herein by reference in its entirety.

BACKGROUND OF THE INVENTION

1. Field of the Invention

The present invention relates a capacitive touch panel, and more particularly, to an electrode pattern design of a capacitive touch panel.

2. Description of the Prior Art

In flexible displays or other wearable devices, it is difficult to make reference grounds corresponding to capacitive sensing electrodes of the display be the same, causing the capacitances of the sensing electrodes easy to be influenced by environment factors. In addition, to solve the manufacturing cost, a touch panel and a liquid crystal module (LCM) are joined together by using edge lamination (also known as air gap or air bonding) technique. However, using the edge lamination to combine the touch panel and the LCM make an air gap between the touch panel and the LCM, and when a touch is applied on the touch panel, a defection of the touch panel will cause non-uniform distribution of the capacitances in the touch panel, and the sensing signals will be influenced.

Figure 1:
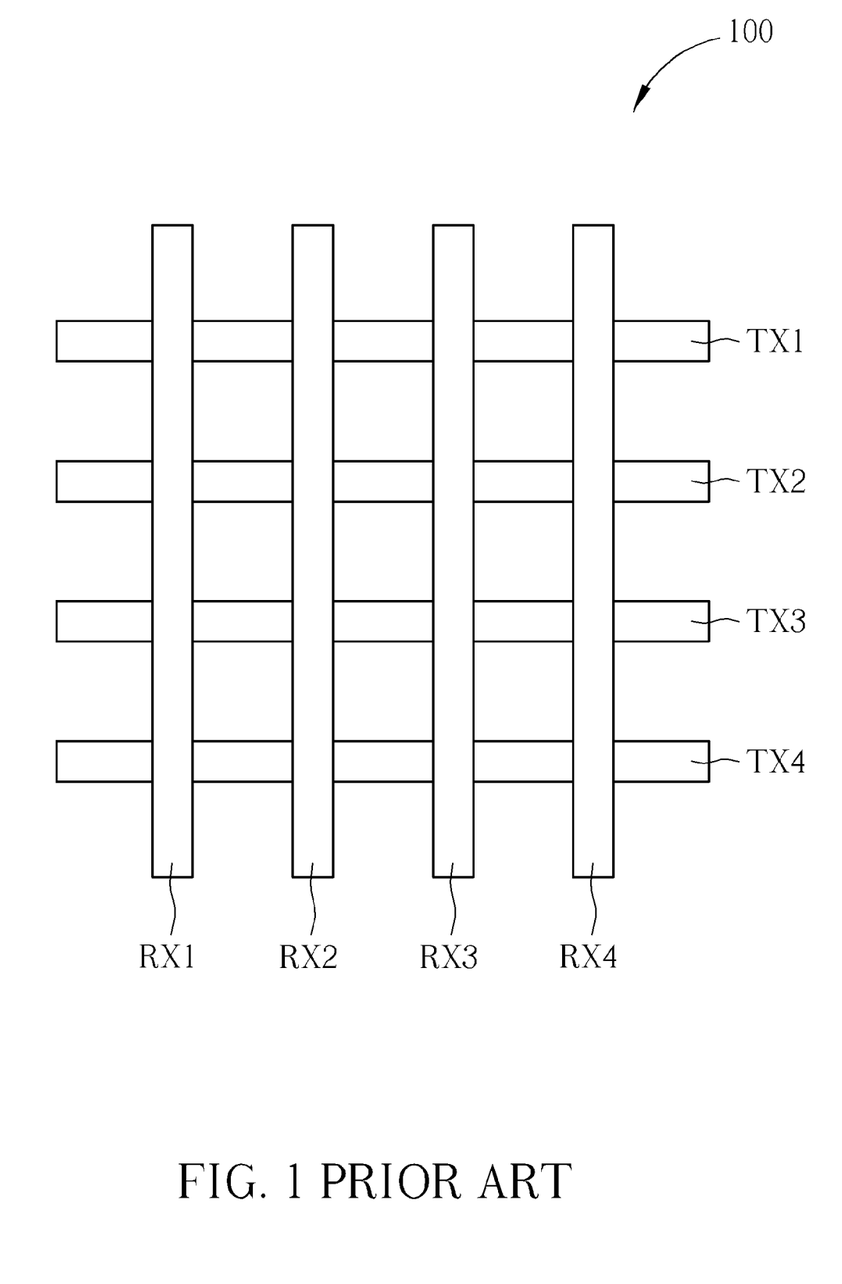
FIG. 1 is a diagram illustrating an active array of a touch panel.
Figure 2:
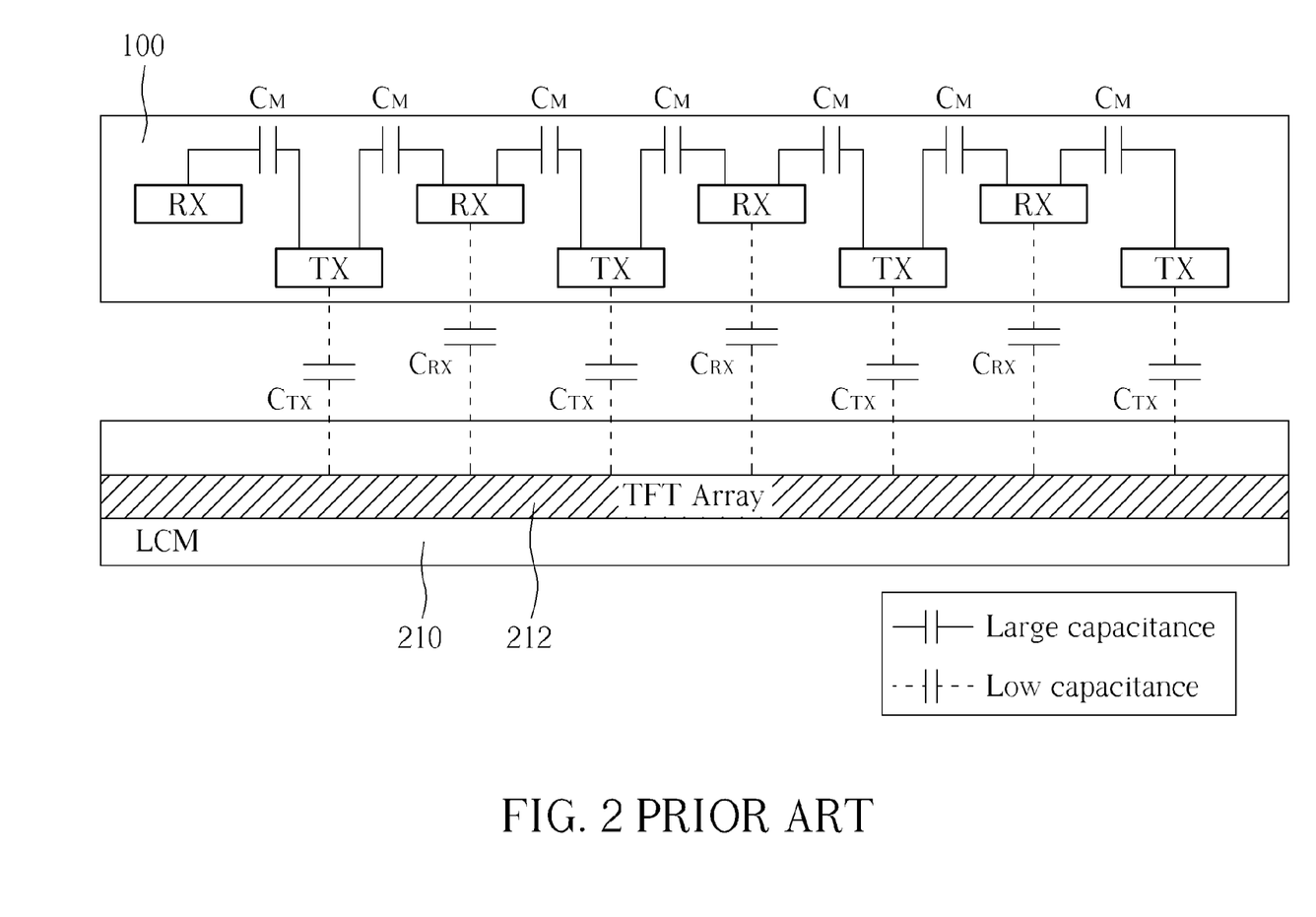
FIG. 2 shows a cross-section view of the touch panel and a LCM and the capacitors existed in the touch panel and the LCM.
Figure 3:
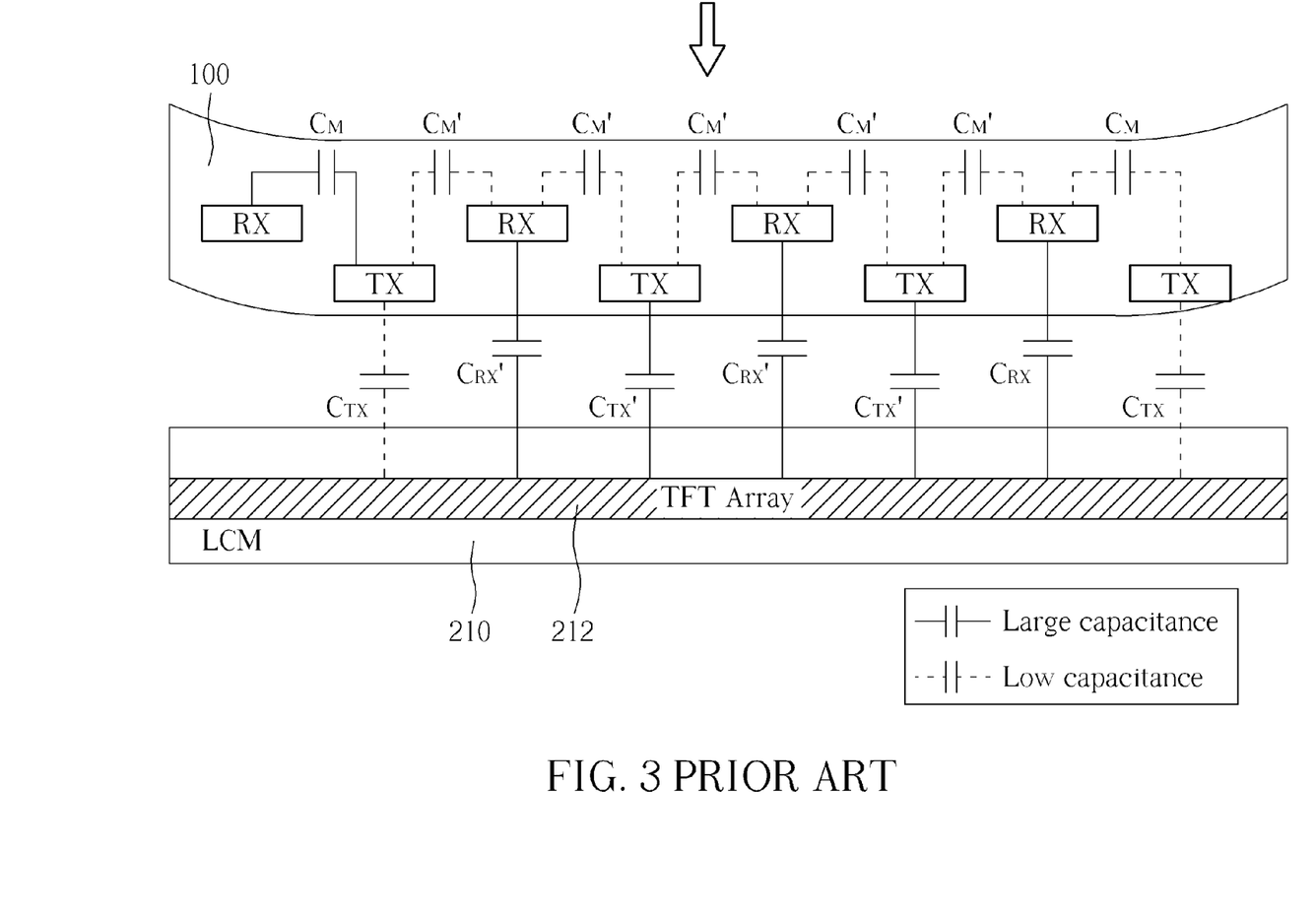
FIG. 3 shows the cross-section view of the touch panel and the LCM when a touch is applied on the touch panel and the capacitance variation of the capacitors existed in the touch panel and the LCM.

Please refer to FIG. 1, FIG. 2 and FIG. 3 together, FIG. 1 is a diagram illustrating an active array of a touch panel 100, FIG. 2 shows a cross-section view of the touch panel 100 and a LCM 210 and the capacitors existed in the touch panel 100 and the LCM 210, FIG. 3 shows the cross-section view of the touch panel 100 and the LCM 210 when a touch is applied on the touch panel 100 and the capacitance variation of the capacitors existed in the touch panel 100 and the LCM 210. As shown in FIG. 1, the active array includes a plurality of first electrodes TX1-TX4 and a plurality of second electrodes RX1-RX4, where the first electrodes TX1-TX4 are used to receive scan signals, and the second electrodes 120_1-120_4 are connected to a detecting circuit (not shown), where the detecting circuit detects changes of voltages of the second electrodes RX1-RX4 to obtain capacitance variation information to determine a position of the touch.

FIG. 2 shows the capacitors $C_{TX}$, $C_{RX}$ and $C_M$ existed in the touch panel 100 and the LCM 210, where $C_{TX}$ is the capacitor between each first electrode TX1-TX4 and a thin film transistor (TFT) array 212 of the LCM 210, $C_{RX}$ is the capacitor between each second electrode RX1-RX4 and the TFT array 212, and $C_M$ is the mutual capacitor between each first electrode TX1-TX4 and its neighboring second electrode RX1-RX4. It is note that the capacitors $C_{TX}$, $C_{RX}$ and $C_M$ shown in FIG. 2 and FIG. 3 are parasitic capacitors rather than intentionally placed capacitors. As shown in FIG. 2, the capacitors $C_{TX}$ and $C_{RX}$ have low capacitances, and the capacitors $C_M$ have relatively large capacitances, that is most of the electrical charges are stored in the capacitors $C_M$.

In FIG. 3, when a touch is applied on the touch panel 100, the touch panel 100 is distorted and the air gap is reduced. At this time the capacitances of some capacitors are changed (e.g. $C_{RX}'$, $C_{TX}'$ and $C_M'$ shown in FIG. 3), in detail, the electrical charges are transferred to the capacitors $C_{TX}$ and $C_{RX}$, that is the capacitances of the capacitors $C_{TX}$ and $C_{RX}$ are increased, the capacitances of the capacitors $C_M$ are decreased. Therefore, because the capacitances of the capacitors $C_M$ are abnormally changed, the voltages detected by the detecting circuit may be influenced, causing detecting errors.

SUMMARY OF THE INVENTION

It is therefore an objective the present invention to provide a capacitive touch panel, which can alleviate the influences caused by the distorted touch panel, to solve the above-mentioned problem.

According to one embodiment of the present invention, an active array of a capacitive touch pane includes a plurality of first electrodes, a plurality of second electrodes and a plurality of first auxiliary electrodes, where the first electrodes are connected to a scan signal transmitting circuit of the capacitive touch panel, and are used for receiving a plurality of scan signals, respectively; the second electrodes are connected to a detecting circuit of the capacitive touch panel; and the first electrodes and the first auxiliary electrodes are fabricated in a same metal layer, and the first electrodes are not connected to the first auxiliary electrodes.

According to another embodiment of the present invention, an active array of a capacitive touch pane includes a plurality of first electrodes, a plurality of second electrodes and a plurality of auxiliary electrodes, where the first electrodes are connected to a scan signal transmitting circuit of the capacitive touch panel, and is used for receiving a plurality of scan signals, respectively; the second electrodes are connected to a detecting circuit of the capacitive touch panel; and the second electrodes and the auxiliary electrodes are fabricated in a same metal layer, and the second electrodes are not connected to the auxiliary electrodes.

According to another embodiment of the present invention, a capacitive touch panel comprises a scan signal transmitting circuit for generating a plurality of scan signals, a detecting circuit and an active array. The active array includes a plurality of first electrodes, a plurality of second electrodes and a plurality of first auxiliary electrodes, where the first electrodes are connected to the scan signal transmitting circuit, and are used for receiving the scan signals, respectively; the second electrodes are connected to a detecting circuit of the capacitive touch panel; and the first electrodes and the first auxiliary electrodes are fabricated in a same metal layer, and the first electrodes are not connected to the first auxiliary electrodes.

According to another embodiment of the present invention, a capacitive touch panel comprises a scan signal transmitting circuit for generating a plurality of scan signals, a detecting circuit and an active array. The active array includes a plurality of first electrodes, a plurality of second electrodes and a plurality of auxiliary electrodes, where the first electrodes are connected to the scan signal transmitting circuit, and are used for receiving the scan signals, respectively; the second electrodes are connected to a detecting circuit of the capacitive touch panel; and the second electrodes and the auxiliary electrodes are fabricated in a same metal layer, and the second electrodes are not connected to the auxiliary electrodes.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
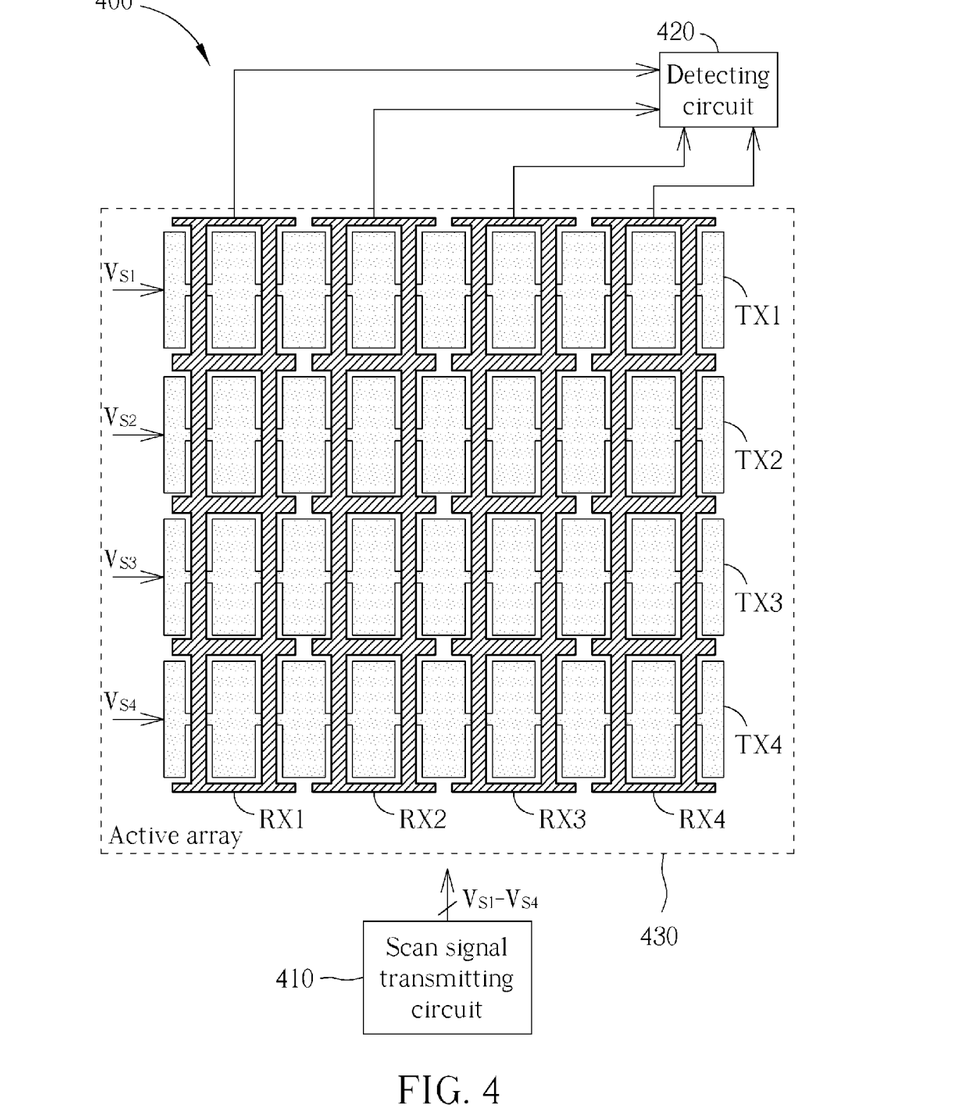
FIG. 4 is a diagram illustrating a capacitive touch panel.

Please refer to FIG. 4, which is a diagram illustrating a capacitive touch panel 400. As shown in FIG. 4, the capacitive touch panel 400 includes a scan signal transmitting circuit 410, a detecting circuit 420 and an active array 430, where the active array 430 comprises a plurality of first electrodes TX-TX4 and a plurality of second electrodes RX1-RX4. Generally, the first electrodes TX-TX4 are called driving lines or scan lines, and the second electrodes RX1-RX4 are called sensing lines in the capacitive touch panel 400. The scan signal transmitting circuit 410 is used to sequentially generate a plurality of scan signals $V_{S1}$-$V_{S4}$ to the first electrodes TX-TX4, respectively, and the detecting circuit 420 detects changes of voltages of the second electrodes RX1-RX4 to obtain capacitance variation information to determine whether a touch is applied on the active array 430, and to determine a position of the touch.

The capacitive touch panel 400 shown in FIG. 4 is used to provide a comparison with capacitive touch panels of the present invention described in the following FIG. 5 and FIG. 8. Please refer to the table 1.1 and table 1.2 shown below, where table 1.1 is a simulation result when a touch is applied on the capacitive touch panel 400 (assuming no bending occurs), and table 1.2 is a simulation result of surrounding regions of a touch point under different bending depths, and the definitions of the capacitances of the capacitors $C_{RX}$, $C_{TX}$ and $C_M$ can refer to the above-mentioned disclosure about FIG. 2 and FIG. 3:

TABLE 1.1

| | |
|---|---|
| $C_{RX}$ | 39 |
| $C_{TX}$ | 59 |
| $C_M$ | 110 |

TABLE 1.2

| Bending depth (mm) | 0 | 0.1 | 0.2 | 0.3 | 0.4 | 0.5 |
|---|---|---|---|---|---|---|
| $C_{RX}$ | 0 | −1 | 3 | 8 | 46 | 210 |
| $C_{TX}$ | 0 | 7 | 29 | 63 | 157 | 255 |
| $C_M$ | 0 | 20 | 35 | 60 | 95 | 170 |

It is noted that the values shown in table 1.1 and table 1.2 are used to represent the changes of the capacitors $C_{RX}$, $C_{TX}$ and $C_M$, that is the values shown in table 1.1 and table 1.2 does not have units. Referring to the above table 1.1 and table 1.2, when a touch is applied, the capacitances of the capacitors $C_{RX}$, $C_{TX}$ and $C_M$ of the surrounding regions are also changed, especially when the bending depth is large such as 0.4 mm or 0.5 mm, the capacitances of the capacitors $C_{RX}$, $C_{TX}$ and $C_M$ of the surrounding regions may be too large to make the detecting circuit 420 erroneously determine the surrounding regions have touches thereon.

Figure 5:
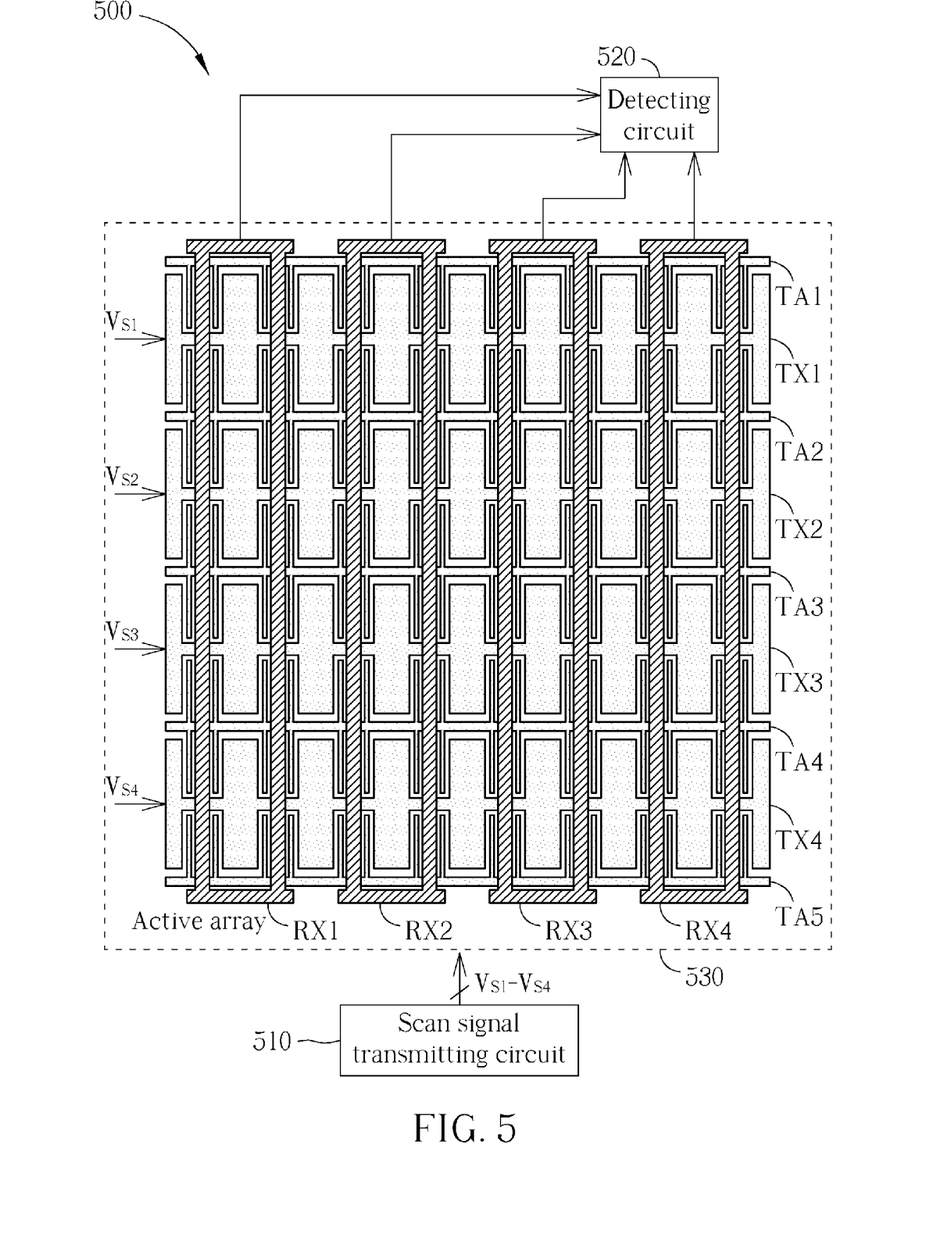
FIG. 5 is a diagram illustrating a capacitive touch panel according to one embodiment of the present invention.

Please refer to FIG. 5, which is a diagram illustrating a capacitive touch panel 500 according to one embodiment of the present invention. As shown in FIG. 5, the capacitive touch panel 500 includes a scan signal transmitting circuit 510, a detecting circuit 520 and an active array 530, where the active array 530 comprises a plurality of first electrodes TX-TX4, a plurality of second electrodes RX1-RX4 and a plurality of auxiliary electrodes TA1-TA5. The scan signal transmitting circuit 510 is used to sequentially generate a plurality of scan signals $V_{S1}$-$V_{S4}$ to the first electrodes TX-TX4, respectively, and the detecting circuit 520 detects changes of voltages of the second electrodes RX1-RX4 to obtain capacitance variation information to determine whether a touch is applied on the active array 530, and to determine a position of the touch. It is noted that the quantity of the first electrodes, second electrodes and the auxiliary electrodes are for illustrative purposes only, a person skilled in the art should understand that the quantity of these electrodes are determined due to the designer's considerations.

In this embodiment, the first electrodes TX1-TX4 and the auxiliary electrodes TA1-TA5 are fabricated in a first metal layer, and the second electrodes RX1-RX4 are fabricated in a second metal layer different from the first metal layer, where the first metal layer and the second metal layer can be any conductive film such as indium tin oxide (ITO), indium zinc oxide (IZO) or nano silver. The first electrodes TX1-TX4 are not connected to the first auxiliary electrodes TA1-TA5 (i.e., the first electrodes TX1-TX5 and the first auxiliary electrodes TA1-TA5 are electrically isolated in the active array 530). For a top view of the active array 530 of the capacitive touch panel 500 shown in FIG. 5 (or a bottom view of the active array 530), the auxiliary electrodes TA1-TA5 are positioned between the first electrodes TX1-TX4 and the second electrodes RX1-RX4.

In this embodiment, the auxiliary electrodes TA1-TA5 are supplied by a bias voltage (DC voltage) such as a system ground voltage provided by a circuit in the capacitive touch panel 500. Therefore, the auxiliary electrodes TA1-TA5 can be regarded as charge-locked electrodes which help to keep the charges in the mutual capacitors (i.e. the capacitors $C_M$) consistently when the capacitive touch panel 500 is bending. Please refer to FIG. 6 and FIG. 7, FIG. 6 shows a cross-section view of the touch panel 500 and a LCM 610 and the capacitors existed in the capacitive touch panel 500 and the LCM 610, FIG. 7 shows the cross-section view of the capacitive touch panel 500 and the LCM 610 when a touch is applied on the capacitive touch panel 500 and the capacitance variation of the capacitors existed in the capacitive touch panel 500 and the LCM 610.

Figure 6:
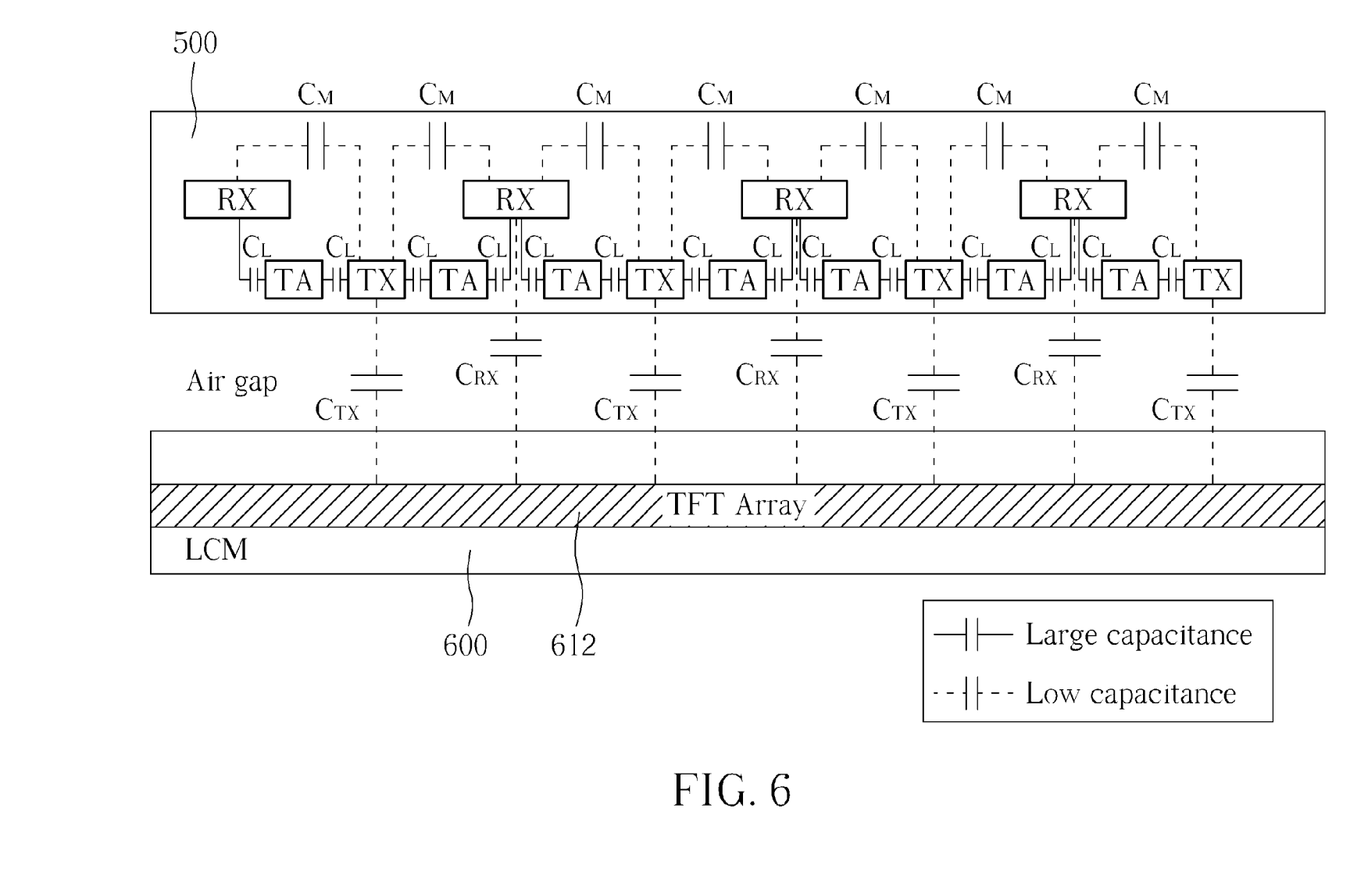
FIG. 6 shows a cross-section view of the touch panel and a LCM and the capacitors existed in the touch panel and the LCM.

FIG. 6 shows the capacitors $C_{TX}$, $C_{RX}$, $C_L$ and $C_M$ existed in the capacitive touch panel 500 and the LCM 610, where $C_{TX}$ is the capacitor between each first electrode TX1-TX4 and a thin film transistor (TFT) array 612 of the LCM 610, $C_{RX}$ is the capacitor between each second electrode RX1-RX4 and the TFT array 612, $C_L$ is the capacitor between each auxiliary electrode and the first/second electrode, and $C_M$ is the capacitor between each first electrode TX1-TX4 and its neighboring second electrode RX1-RX4. It is note that the capacitors $C_{TX}$, $C_{RX}$, $C_L$ and $C_M$ shown in FIG. 6 and FIG. 7 are parasitic capacitors rather than intentionally placed capacitors. As shown in FIG. 6, the capacitors $C_{TX}$, $C_{RX}$ and $C_M$ have low capacitances, and the capacitors $C_L$ have relatively large capacitances, that is most of the electrical charges are stored in the capacitors $C_L$.

Figure 7:
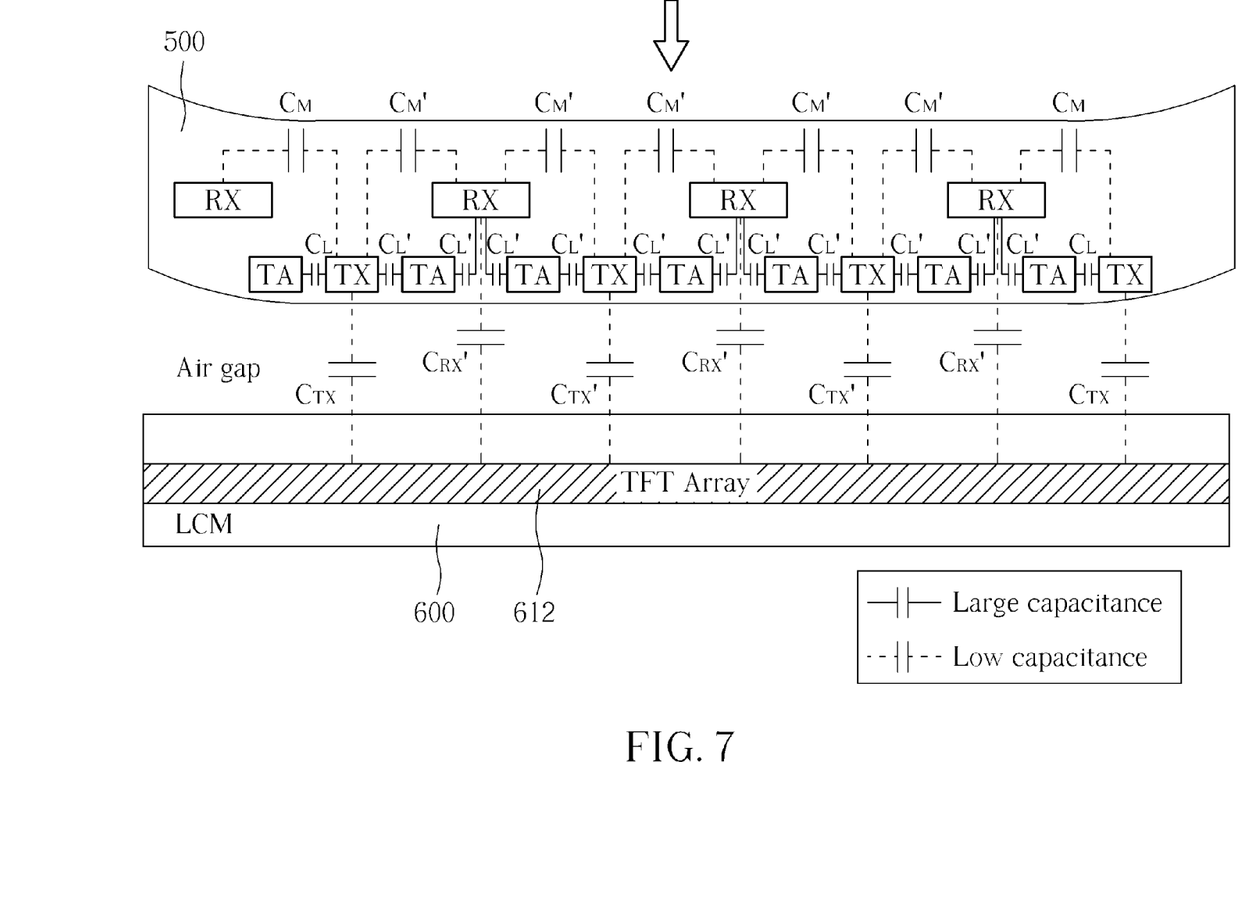
FIG. 7 shows the cross-section view of the touch panel and the LCM when a touch is applied on the touch panel and the capacitance variation of the capacitors existed in the touch panel and the LCM.

In FIG. 7, when a touch is applied on the capacitive touch panel 500, the capacitive touch panel 500 is distorted and the air gap is reduced. At this time the capacitances of some capacitors are changed (e.g. $C_{RX}'$, $C_{TX}'$, $C_M'$ and $C_L'$ shown in FIG. 7). However, because the capacitors $C_L$ hold the most charges, the capacitance variation of the capacitors $C_M$ is small. Therefore, the voltages detected by the detecting circuit 520 may not be influenced too much.

In detail, Please refer to the table 2.1 and table 2.2 shown below, where table 2.1 is a simulation result when a touch is applied on the capacitive touch panel 500 (assuming no bending occurs), and table 2.2 is a simulation result of surrounding regions of a touch point under different bending depths, and the definitions of the capacitances of the capacitors $C_{RX}$, $C_{TX}$ and $C_M$ can refer to FIG. 6 and FIG. 7:

TABLE 2.1

| | |
|---|---|
| $C_{RX}$ | 17 |
| $C_{TX}$ | 41 |
| $C_M$ | 70 |

TABLE 2.2

| Bending depth (mm) | 0 | 0.1 | 0.2 | 0.3 | 0.4 | 0.5 |
|---|---|---|---|---|---|---|
| $C_{RX}$ | 0 | 4 | 7 | 14 | 29 | 75 |
| $C_{TX}$ | 0 | 9 | 27 | 57 | 129 | 255 |
| $C_M$ | 0 | 0 | 5 | 5 | 15 | 45 |

It is noted that the values shown in table 2.1 and table 2.2 are used to represent the changes of the capacitors $C_{RX}$, $C_{TX}$ and $C_M$, that is the values shown in table 2.1 and table 2.2 does not have units. Referring to the above table 2.1 and table 2.2, when a touch is applied, although the capacitances of the capacitors $C_M$ of the surrounding regions are changed, the variation is small. Compared with the capacitive touch panel 400 shown in FIG. 4 and the above-mentioned table 1.2, the capacitive touch panel 500 shown in FIG. 5 indeed lower the variation of the capacitors $C_M$ when a touch is applied. Because the capacitor $C_M$ is the factor that most influences the determination of the detecting circuit 520, the detecting circuit 520 can determine the position of the touch more accurately even when the bending depth is greater than 0.4 mm.

Figure 8:
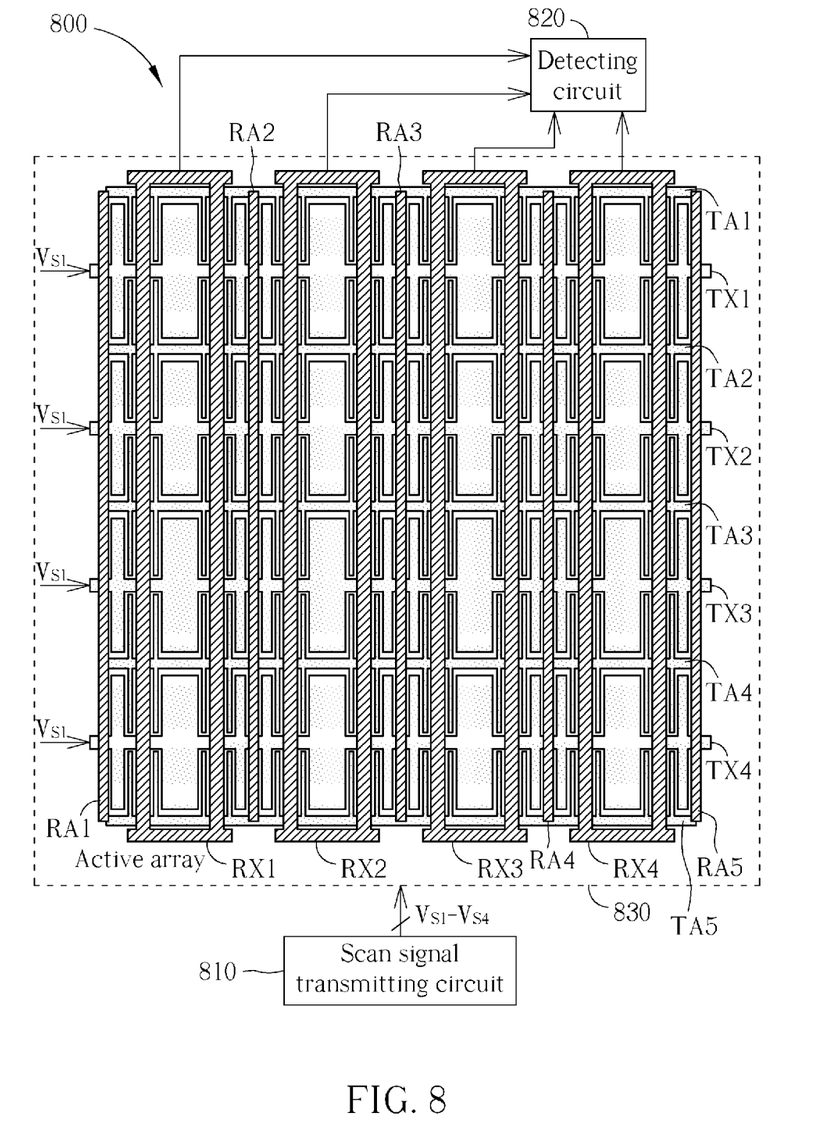
FIG. 8 is a diagram illustrating a capacitive touch panel according to another embodiment of the present invention.

Please refer to FIG. 8, which is a diagram illustrating a capacitive touch panel 800 according to another embodiment of the present invention. As shown in FIG. 8, the capacitive touch panel 800 includes a scan signal transmitting circuit 810, a detecting circuit 820 and an active array 830, where the active array 830 comprises a plurality of first electrodes TX-TX4, a plurality of second electrodes RX1-RX4, a plurality of first auxiliary electrodes TA1-TA5 and a plurality of second auxiliary electrodes RA1-RA5. The scan signal transmitting circuit 810 is used to sequentially generate a plurality of scan signals $V_{S1}$-$V_{S4}$ to the first electrodes TX-TX4, respectively, and the detecting circuit 820 detects changes of voltages of the second electrodes RX1-RX4 to obtain capacitance variation information to determine whether a touch is applied on the active array 830, and to determine a position of the touch. It is noted that the quantity of the first electrodes, second electrodes and, first auxiliary electrodes and second auxiliary electrodes are for illustrative purposes only, a person skilled in the art should understand that the quantity of these electrodes are determined due to the designer's considerations.

In this embodiment, the first electrodes TX1-TX4 and the first auxiliary electrodes TA1-TA5 are fabricated in a first metal layer, and the second electrodes RX1-RX4 and the second auxiliary electrodes RA1-RA5 are fabricated in a second metal layer different from the first metal layer, where the first metal layer and the second metal layer can be any conductive film such as ITO, IZO or nano silver. The first electrodes TX1-TX4 are not connected to the first auxiliary electrodes TA1-TA5 (i.e., the first electrodes TX1-TX4 and the first auxiliary electrodes TA1-TA5 are electrically isolated in the active array 830), and the second electrodes RX1-RX4 are not connected to the second auxiliary electrodes RA1-RA5 (i.e., the second electrodes RX1-RX4 and the second auxiliary electrodes RA1-RA5 are electrically isolated in the active array 830). For a top view of the active array 830 of the capacitive touch panel 800 shown in FIG. 8 (or a bottom view of the active array 830), the auxiliary electrodes TA1-TA5 are positioned between the first electrodes TX1-TX4 and the second electrodes RX1-RX4.

In this embodiment, the first auxiliary electrodes TA1-TA5 and the second electrodes RX1-RX4 are supplied by a bias voltage (DC voltage) such as a system ground voltage provided by a circuit in the capacitive touch panel 800. Therefore, the first auxiliary electrodes TA1-TA5 and the second electrodes RX1-RX4 can be regarded as charge-locked electrodes which help to keep the charges in the mutual capacitors (i.e. the capacitors $C_M$) consistently when the capacitive touch panel 800 is bending. In another embodiment, the first auxiliary electrodes TA1-TA5 are supplied by a first bias voltage, the second electrodes RX1-RX4 are supplied by a second bias voltage different from the first bias voltage.

Please refer to the table 3.1 and table 3.2 shown below, where table 3.1 is a simulation result when a touch is applied on the capacitive touch panel 800 (assuming no bending occurs), and table 3.2 is a simulation result of surrounding regions of a touch point under different bending depths, and the definitions of the capacitances of the capacitors $C_{RX}$, $C_{TX}$ and $C_M$ can refer to FIG. 6 and FIG. 7:

TABLE 3.1

| | |
|---|---|
| $C_{RX}$ | 17 |
| $C_{TX}$ | 34 |
| $C_M$ | 60 |

TABLE 3.2

| Bending depth (mm) | 0 | 0.1 | 0.2 | 0.3 | 0.4 | 0.5 |
|---|---|---|---|---|---|---|
| $C_{RX}$ | 0 | 2 | 6 | 14 | 27 | 75 |
| $C_{TX}$ | 0 | 7 | 20 | 41 | 97 | 255 |
| $C_M$ | 0 | 0 | 5 | 10 | 40 | 40 |

It is noted that the values shown in table 3.1 and table 3.2 are used to represent the changes of the capacitors $C_{RX}$, $C_{TX}$ and $C_M$, that is the values shown in table 3.1 and table 3.2 does not have units. Referring to the above table 3.1 and table 3.2, when a touch is applied, although the capacitances of the capacitors $C_M$ of the surrounding regions are changed, the variation is small. Compared with the capacitive touch panel 400 shown in FIG. 4 and the above-mentioned table 1.2, the capacitive touch panel 800 shown in FIG. 8 indeed lower the variation of the capacitors $C_M$ when a touch is applied. Because the capacitor $C_M$ is the factor that most influences the determination of the detecting circuit 820, the detecting circuit 820 can determine the position of the touch more accurately even when the bending depth is greater than 0.4 mm.

In another embodiment, the first auxiliary electrodes TA1-TA5 can be removed from the capacitive touch panel 800, that is the active array 830 only comprises the first electrodes TX-TX4, the second electrodes RX1-RX4, and the second auxiliary electrodes RA1-RA5. This alternative design shall fall within the scope of the present invention.

In the above-mentioned embodiments shown in FIG. 5 and FIG. 8, the auxiliary electrodes TA1-TA5 and RA1-RA5 serve as charge-locked electrodes to keep the most charges in the capacitors $C_L$ to lower the variation of the capacitors $C_M$ caused by the bending of the capacitive touch panel when a touch is applied. However, the auxiliary electrodes TA1-TA5 and RA1-RA5 can also reduce the interferences from the LCM. Please refer to the table 4.1, table 4.2 and table 4.3 shown below, where table 4.1 is a simulation result of the interferences caused by the LCM for the first electrodes TX1-TX4 and the second electrodes RX1-RX4 of the active array 430 shown in FIG. 4, table 4.2 is a simulation result of the interferences caused by the LCM for the first electrodes TX1-TX4 and the second electrodes RX1-RX4 of the active array 530 shown in FIG. 5, and the table 4.3 is a simulation result of the interferences caused by the LCM for the first electrodes TX1-TX4 and the second electrodes RX1-RX4 of the active array 830 shown in FIG. 8.

TABLE 4.1

| Bonding type | Air gap | | | Full lamination | | |
|---|---|---|---|---|---|---|
| | Cs | Cc | Cc/Cs | Cs | Cc | Cc/Cs |
| RX | 6.66 | 0.8 | 12.01% | 7.3 | 2.3 | 31.51% |
| TX | 7.6 | 1.43 | 18.82% | 9.8 | 4.4 | 44.90% |

TABLE 4.2

| Bonding type | Air gap | | | Full lamination | | |
|---|---|---|---|---|---|---|
| | Cs | Cc | Cc/Cs | Cs | Cc | Cc/Cs |
| RX | 6.6 | 0.42 | 6.36% | 7 | 1.28 | 18.29% |
| TX | 6.7 | 1.14 | 17.01% | 8.5 | 3.52 | 41.41% |

TABLE 4.3

| Bonding type | Air gap | | | Full lamination | | |
|---|---|---|---|---|---|---|
| | Cs | Cc | Cc/Cs | Cs | Cc | Cc/Cs |
| RX | 6.6 | 0.42 | 6.36% | 6.98 | 1.28 | 18.34% |
| TX | 7.44 | 0.88 | 11.83% | 8.8 | 2.9 | 32.95% |

In the above table 4.1, table 4.2 and table 4.3, Cs is a total capacitance of the first electrode TX or the second electrode RX, and Cc is a couple capacitance caused by signals of the LCM. Referring to the above tables, the ratio Cc/Cs of the second electrode RX of the active array 430 shown in FIG. 4 is 12.01%, and the ratio Cc/Cs of the second electrode RX of the active array 530 shown in FIG. 5 (or the active array 830 shown in FIG. 8) is 6.36%, therefore, the embodiments shown in FIG. 5 and FIG. 8 indeed reduce the interferences caused by the LCM, and the signal to noise ratio (SNR) of the capacitive touch panel 500/800 is twice the SNR of the capacitive touch panel 400.

Briefly summarized, in the capacitive touch panel of the present invention, the active array comprises additional auxiliary electrodes to serve as the charge-locked electrodes to keep the most charges in the capacitors CL to lower the variation of the capacitors CM caused by the bending of the touch panel when a touch is applied. In addition, these auxiliary electrodes can also reduce the interferences from the LCM to increase the SNR.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active array of a capacitive touch panel, comprising:
   a plurality of first electrodes, connected to a scan signal transmitting circuit of the capacitive touch panel, for receiving a plurality of scan signals, respectively;
   a plurality of second electrodes, connected to a detecting circuit of the capacitive touch panel;
   a plurality of first auxiliary electrodes supplied by a bias voltage; and
   a plurality of second auxiliary electrodes;
   wherein the first electrodes and the first auxiliary electrodes are fabricated in a first metal layer, and the first electrodes are not connected to the first auxiliary electrodes; the second electrodes and the second auxiliary electrodes are fabricated in a second metal layer different from the first metal layer, and the second electrodes are not connected to the second auxiliary electrodes.

2. The active array of claim 1, wherein, for a top view or a bottom view of the active array of the capacitive touch panel, the first auxiliary electrodes are positioned between the first electrodes and the second electrodes.

3. The active array of claim 1, wherein the second auxiliary electrodes are parallel to the second electrodes.

4. The active array of claim 1, wherein the second auxiliary electrodes are supplied by the bias voltage.

5. The active array of claim 1, wherein, for a view in front of a plane of the capacitive touch panel for receiving a user's touch, the first auxiliary electrodes and the second auxiliary electrodes are intersected.

6. A capacitive touch panel, comprising:
a scan signal transmitting circuit, for generating a plurality of scan signals;
a detecting circuit; and
an active array, comprising:
- a plurality of first electrodes, connected to the scan signal transmitting circuit, for receiving the scan signals, respectively;
- a plurality of second electrodes, connected to the detecting circuit;
- a plurality of first auxiliary electrodes supplied by a bias voltage; and
- a plurality of second auxiliary electrodes;
wherein the first electrodes and the first auxiliary electrodes are fabricated in a first metal layer, and the first electrodes are not connected to the first auxiliary electrodes; the second electrodes and the second auxiliary electrodes are fabricated in a second metal layer different from the first metal layer, and the second electrodes are not connected to the second auxiliary electrodes.

7. The capacitive touch panel of claim 6, wherein, for a top view or a bottom view of the active array of the capacitive touch panel, the first auxiliary electrodes are positioned between the first electrodes and the second electrodes.

8. The capacitive touch panel of claim 6, wherein the second auxiliary electrodes are parallel to the second electrodes.

9. The capacitive touch panel of claim 6, wherein the second auxiliary electrodes are supplied by the bias voltage.

10. The capacitive touch panel of claim 6, wherein, for a view in front of a plane of the capacitive touch panel for receiving a user's touch, the first auxiliary electrodes and the second auxiliary electrodes are intersected.

* * * * *